H. SKINNER.
Churn.
No. 8,596.
Patented Dec. 16, 1851.
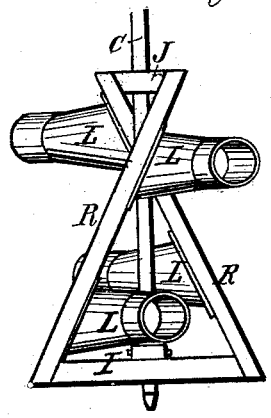
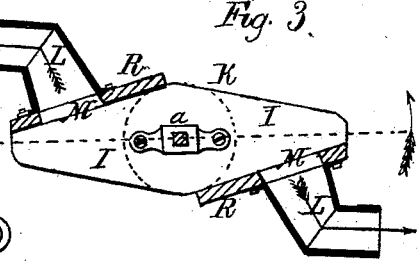
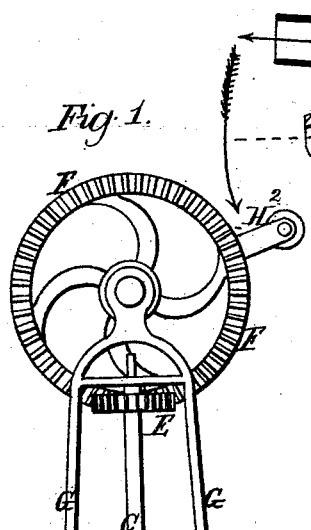
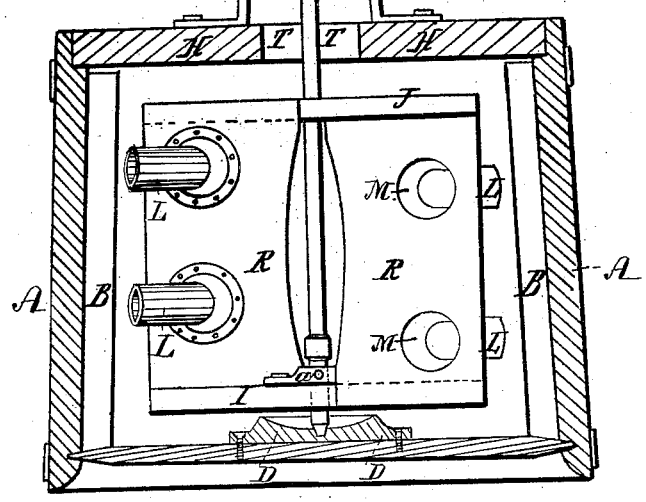

UNITED STATES PATENT OFFICE.

HENRY SKINNER, OF ATTICA, NEW YORK.

CHURN.

Specification of Letters Patent No. 8,596, dated December 16, 1851.

*To all whom it may concern:*

Be it known that I, HENRY SKINNER, of Attica, in the county of Wyoming and State of New York, have invented certain new and useful Improvements in the Churn-Dash; and I do hereby declare the following to be a full and clear description thereof, reference being had to the subjoined drawings of the same, making part of this specification.

Figure 1, is a vertical section through the churn, showing a side elevation of the beaters. Fig. 2, is an elevation looking toward the edge of the beaters and showing the tapered tubes projecting therefrom. Fig. 3, is a horizontal section through the beaters and tubes.

The arrows in Fig. 3, show the direction of the turning of the dasher and the passage of the cream through the tubes.

Similar letters on the several figures refer to the same parts.

A, is the churn tub made in the form of a frustum of a cone and provided with four vertical stops or ledges B, projecting from the inner surface at equal distances apart for creating a counter agitation in the cream and for preventing its being carried round with the beaters in a circular mass which would retard the separation of the particles of butter from the milk or cream.

C, is the rotating vertical shaft for turning the beaters, its lower end being made square and slightly tapering and passing through a square hole in a plate fastened to the dasher and turning in a circular concave bearing or cavity in the center of a dish shaped bearing plate D, confined to the bottom of the tub by screws. The use of this dish shape or concave plate D, is to catch the point of the vertical shaft C, when placing it with the beaters into the tub, and direct it to the central hole in which said shaft revolves.

On the upper end of the vertical shaft there is a pinion E, made to match with a cog wheel F, supported and turning on a metallic frame G, mounted on a section of the lid H, for imparting to the shaft and beaters the required motion.

From the periphery of the cog wheel F, projects an arm $H^2$, to which a handle is attached for increasing the distance of the same from the center of said wheel, and consequently the leverage thereof and thus the power required to operate the churn is considerably lessened.

My improvements more particularly relate to the employment of rotating, inclined, tapered tubes, in connection with two peculiarly shaped inclined beaters, secured to and rotating with said shaft, by which the cream is lifted over the frontward surface of the beaters and a portion discharged centrifugally through the said tubes, which project from the rear sides of the beaters, against the concave surface of the churn tube, and also deflecting a portion in the same direction against the ledges B, thus producing the most efficient agitation of the cream and consequently the most rapid production of butter, and at the same time increasing the benefit of atmospheric influence.

The peculiarity of the beater R consists in attaching their lower ends to the opposing edges of an angular shaped board I, to which the central shaft is affixed on either side of said shaft, and inclining them upward in contrary directions so as to form a figure resembling the letter X, and uniting their upper ends to the opposing edges of a cross piece J, through which the said vertical shaft also passes. The lower ends of said beaters diverging on either side of the central shaft, by which the inner lower edges are made tangential to the central dotted circle K, while their lower outer edges are nearly diametrically opposite, thus giving to said beaters R a peculiar inclination and twist, which has the effect of elevating the cream over their surface and partially discharging it through the tubes and also deflecting it centrifugally from their surface against the ledges B and thus effectually counteracting the tendency of the cream to assume a circular motion in an unbroken mass.

The centrifugal tubes L are made of tin, and are attached to the flat sides of each beater near the outer edge thereof, and made to project rearward about 2½ inches and thence outward, nearly at right angles about one inch, or beyond the edge of the beaters, there being openings M, in said beaters R corresponding with the tubes and through which the cream passes. These tubes L extend horizontally from the beaters and are tapered from the beaters to their angles, or juncture with the outward portion which are also inclined rearward and at an angle of about 10 degrees, as seen in Fig. 3, so as to facilitate the discharge of the cream through the same. This feature of tapered, inclined, centrifugal tubes L, in connection with the peculiar inclined beaters R has been found to possess advantages that have not heretofore been combined with the vertical rotating beater churn. The top cross piece J of the beaters projects over the frontward surface thereof and serves to prevent the cream rising to the lid of the churn tub, during the rotation of the beaters and prevents the escape of the cream through the central opening T in the lid.

The two sections of the lid of the tub, placed on either side of the central section H may be removed after the butter has been collected into a mass.

The openings and tubes in the beaters are so arranged that they shall not rotate in the same horizontal plane, as will be seen by the dotted lines in Fig. 1.

The churn is operated by turning the crank H². The butter being produced, the lid and beaters with the propelling gear are removed, the tub is tilted and the buttermilk poured off; the butter is then removed and worked in the usual manner.

Having thus described the nature of my invention and improvement, I wish it to be understood that I make no claim to originality of invention in any of the individual parts of the churn, except the dasher, and this I claim only when it is constructed with inclined perforated paddles and tapered elbow tubes L combined, for directing the cream or milk upward and also throwing it centrifugally against the ribs B and concave surface of the churn tub A during the operation of churning in the peculiar manner herein set forth.

In testimony whereof I have hereunto signed my name before two subscribing witnesses.

HENRY SKINNER.

Witnesses:
 HARVEY PUTNAM,
 F. C. FARNHAM.